United States Patent
Ghameshlu et al.

(10) Patent No.: US 6,694,449 B2
(45) Date of Patent: Feb. 17, 2004

(54) DUPLICABLE PROCESSOR DEVICE

(75) Inventors: Majid Ghameshlu, Vienna (AT); Wolfgang Kainrath, Vienna (AT); Stephan Knecht, Thalwil (CH)

(73) Assignee: Siemens Aktiengesellschaft, Munich (DE)

( * ) Notice: Subject to any disclaimer, the term of this patent is extended or adjusted under 35 U.S.C. 154(b) by 554 days.

(21) Appl. No.: 09/761,803

(22) Filed: Jan. 16, 2001

(65) Prior Publication Data

US 2001/0025352 A1 Sep. 27, 2001

Related U.S. Application Data

(63) Continuation of application No. PCT/DE99/01917, filed on Jul. 1, 1999.

(30) Foreign Application Priority Data

Jul. 16, 1998 (DE) .......................................... 198 32 060

(51) Int. Cl.[7] .............................................. G06F 11/00
(52) U.S. Cl. .............................. 714/11; 714/12; 714/48
(58) Field of Search ................................ 714/11, 12, 9, 714/31, 48, 43, 56

(56) References Cited

U.S. PATENT DOCUMENTS

| | | | | |
|---|---|---|---|---|
| 5,086,429 A | * | 2/1992 | Gray et al. ................... 714/13 |
| 5,504,859 A | * | 4/1996 | Gustafson et al. ............. 714/11 |
| 5,513,338 A | * | 4/1996 | Alexander et al. ............. 703/28 |
| 5,535,405 A | * | 7/1996 | Byers et al. ................. 710/110 |
| 5,600,786 A | * | 2/1997 | Baker et al. ................... 714/11 |
| 5,692,121 A | * | 11/1997 | Bozso et al. .................. 714/13 |
| 5,729,678 A | * | 3/1998 | Hunt et al. .................... 714/43 |
| 5,748,873 A | * | 5/1998 | Ohguro et al. ................. 714/11 |
| 5,838,900 A | * | 11/1998 | Horvath et al. ................ 714/56 |
| 5,850,512 A | * | 12/1998 | Song ........................... 714/43 |
| 5,963,979 A | * | 10/1999 | Inoue ......................... 711/162 |
| 6,065,135 A | * | 5/2000 | Marshall et al. ............... 714/11 |
| 6,173,416 B1 | * | 1/2001 | Liddell et al. ................. 714/11 |
| 6,263,452 B1 | * | 7/2001 | Jewett et al. .................. 714/9 |

* cited by examiner

Primary Examiner—Robert Beausoliel
Assistant Examiner—Yolanda L Wilson
(74) Attorney, Agent, or Firm—Laurence A. Greenberg; Werner H. Stemer; Gregory L. Mayback (57) ABSTRACT

A processor device includes a clock generation unit, a processor unit, a main memory, a processor bus, and also a bus control device having an interface for a crossover bus to at least one further processor device. The bus control device monitors processor device data access through the processor bus, interchanges signals concerning data access through the crossover bus, evaluates them and outputs an error signal based on the evaluation result. In a processor system including at least two processor devices connected to one another through the crossover bus, the processor units are started in synchronism. The bus control devices in the processor devices interchange signals through the crossover bus upon each data access operation by the processor units, and output an error signal if there is no correspondence. If there is an error in one processor device, operation of the processor system is continued on the other processor device or devices.

23 Claims, 2 Drawing Sheets

DUPLICABLE PROCESSOR DEVICE

CROSS-REFERENCE TO RELATED APPLICATION

This application is a continuation of copending International Application No. PCT/DE99/01917, filed Jul. 1, 1999, which designated the United States.

BACKGROUND OF THE INVENTION

Field of the Invention

The invention lies in the field of microelectronics. The invention relates to a processor device that contains a clock generation unit, a processor unit, a main memory, and a processor bus set up as a data and address bus for the processor unit and the main memory.

Processor devices of the aforementioned type are used for controlling various technical systems, such as call processing systems in a telephone network. Depending on the area of application, the processor device has additional, application-specific components that are controlled by the processor device and that possibly even control other, external components in turn.

In many applications, including in the aforementioned call processing systems, a particular level of error immunity is required for security-related reasons. To achieve the error immunity, the fundamental hardware parts within the processor system of the application controller are duplicated. Thus, the processor system contains two identical versions of a processor device, one of which carries out the tasks of the processor system as the active device while the other device is passive and operates in idle mode, or in parallel in a "tandem mode." On the active side, error occurrence is monitored during operation. In the event of an error in the active device, the passive device automatically takes up operation, with the intent that the changeover takes place in as uncomplicated a fashion as possible and without the user noticing. The now passive device can then be serviced or replaced without the need for concern that operation, which is assured by the now active device, might be interrupted.

If, in particular cases, the requirements of system security are very high and duplication is no longer sufficient, the processor device may also be implemented a plurality of times within the processor system, one of the devices always being active while the others are passive. In such a case, the monitoring and the order of the reciprocal enabling of the processor devices may be cyclical, for example. The duplicated case can easily be generalized to the more general case of multiplication by a person skilled in the art and, for the sake of brevity, such generalization is always dealt with in parallel without any mention below when discussing duplicated systems, unless express reference is made to the contrary.

In prior art methods, the passive side is updated at the instant of changeover. In this context, the passive processor device first changes to the operating state when an error has occurred on the part of the active processor device, as far as possible adopts the status of the active processor device, e.g., the content of the main memory, and then continues operation. The process is naturally associated with a markedly perceptible interruption in operation, and, in many cases, individual areas of operation or even the whole of operation need to be terminated completely and restarted. In a switching office, for example, such steps mean a temporary or permanent interruption in a data link or message transmission.

International PCT publication WO 94/08292 describes a duplicated processor control unit including two identical, interconnected control units each having a processor unit, a RAM data memory, and peripheral circuits. Each processor unit is set up to establish whether or not it is active or in standby mode. The active processor unit performs the write cycles on the RAM synchronously in the two duplicated RAMs or in one of the two RAMs. The standby unit remains in standby until it is called on account of a fault in the active unit, in which it replaces the previously active unit. The two processor units are additionally connected through a synchronous communication channel produced using dedicated modules. The communication channel is used by the active processor unit when carrying out particular activities, e.g., monitoring processes and error diagnosis processes, which it carries out on the standby unit.

The activities of the two processor units disclosed in International PCT publication WO 94/08292 are, thus, essentially asymmetrical, with the communication channel being used to shift processes from the active unit to the standby unit, the peripheral components, including the main memory, essentially being accessed only by the active processor unit. Hence, in the absence of any comparison with a second processor unit running in parallel, for example, a malfunction in the active processor unit results in the main memory having incorrect information written to it or in faulty states in the peripherals, which states first need to be re-corrected after changeover to the previous standby unit.

Each of the two processor units in International PCT publication WO 94/08292 is additionally equipped with two microprocessors operating in microsynchronized mode. The microsynchronism of the two microprocessors is monitored by a comparator block that monitors the identity of the address, data, and control signals of the two processors at each instant; any discrepancy is interpreted as a fault in the relevant processor unit. An error in the microsynchronous operation of the microprocessor pair thus produces an interrupt signal or reset for the whole processor unit. Operation of the processor unit based on just one of the two microprocessors is not possible. Furthermore, duplication of the microprocessors within a processor unit produces a "tandem unit," not, however, inherently independent processor devices with a respective dedicated main memory and processor bus comparable with a processor device in accordance with the subject matter of the present invention. In addition, the microsynchronism of the microprocessors that is disclosed in International PCT publication WO 94/08292 is established on an entirely different structural level as compared with the processor units.

German Published, Non-Prosecuted Patent Application DE 40 05 321 A1, discloses an error-tolerant computer system having two redundant computer units. The activities of the two computer units are also asymmetrical because, respectively, one computer unit is operational and writes to the main memories in both units, while the other is available as a backup switching unit. Microsynchronous parallel operation between the processors in the two computer units is expressly excluded in German Published, Non-Prosecuted Patent Application DE 40 05 321 A1.

The article by H. J. Lohmann in Elektron. Rechenanlagen 22 (1980), pp. 229–236, discloses a microcomputer system including two microcomputers of identical configuration for producing output signals to control railway signal equipment. The microcomputers each produce an output signal; the two output signals are supplied to the actuating circuits through converters. The microcomputer clock signals are produced separately for each of the two microcomputers in a respective control pulse generator. After each processing clock step, a monitoring pulse transmitted by the control pulse generators causes the output signals to be compared. The control pulse generators then trigger the next clock step only if the respective no-error message has been received correctly. The configuration imposes reliable correspondence verification after each processing step. If a disparity arises, the no-error messages are not sent and the control pulse generators do not trigger another clock step; consequently, the actuating circuits switch to a de-energized state.

As is clear from the above, the output signals in the system according to H. J. Lohmann are compared; a reciprocal check on an internal state of the processor devices is not possible. Another disadvantage to the system according to H. J. Lohmann is that the speed of the microcomputer system is markedly reduced because a complete check on the output signals is performed before each processing step. In addition, the microcomputer system is configured only for simultaneous operation of the two microprocessors—much like the microprocessor pair in a respective processor unit in International PCT publication WO 94/08292—because individual operation of one microcomputer, not to mention the presence of just one microcomputer (while the other is being serviced, for example), is not provided. Instead, the entire system is always in operation or not in operation.

The microcomputer system according to H. J. Lohmann can be used by the person skilled in the art as an advantageous illustrative embodiment of a processor unit in International PCT publication WO 94/08292 having two microsynchronized microprocessors. In addition, the implementation of microsynchronism within the processor units would make it appear unnecessary to introduce microsynchronism between the two processor units.

SUMMARY OF THE INVENTION

It is accordingly an object of the invention to provide a duplicable processor device that overcomes the hereinafore-mentioned disadvantages of the heretofore-known devices of this general type and that can be operated in a microsynchronous operating mode in which the processors in the devices perform the same operations on the same clock edge and are checked against one another in the process, and that can have one processor device permit full operation independently as well. In particular, the aim is for error monitoring and error handling to be able to take place almost entirely without interruption to the application-specific control.

With the foregoing and other objects in view, there is provided, in accordance with the invention, a processor device, including a clock generation unit, a processor unit connected to the clock generation unit, a main memory, a processor bus configured as a data and address bus for the processor unit and the main memory, a crossover bus to be connected to at least one further processor device, and a bus control device having an interface for the crossover bus, the bus control device having an operating mode sharing microsynchronism with the at least one further processor device connected through the crossover bus during operation of the processor device, the bus control device configured, when data is interchanged through the processor bus, to process a personal signature for interchanged data, to interchange the personal signature with the at least one further bus control device of at least one further processor device through the crossover bus, to compare a received signature with the personal signature, and to output an error signal triggering error handling in the processor device when the personal signature and the received signature do not correspond.

The objective of the invention is achieved, based on a processor device having a bus control device therein and an interface for a crossover bus to at least one further processor device. The processor device is set up so that, during operation of the processor device in an operating mode that shares microsynchronism with the at least one processor device connected through the crossover bus, when data is interchanged through the processor bus, e.g., upon data access by the processor unit, the processor:

calculates or receives a signature for the interchanged data;

interchanges the signature with the at least one further bus control device through the crossover bus;

compares the signature received with the personal signature; and in the event of the signatures not corresponding, outputs an error signal that triggers error handling, e.g., error diagnosis, in the processor device.

The solution of the invention makes it possible to reliably monitor the processor functions during operation and to quickly initiate error handling in the event of a discrepancy, without the need for concern about a fault in the application operation. The signature interchange permits parallel execution in two or more devices within the context of microsynchronism and makes it possible to detect any asynchronism arising in the event of an error after a latency time of a few system clock cycles. The detection enables interruptions to operation in the event of an error, and also during servicing, to be reduced to a minimum or even to be prevented completely.

In contrast to the system according to H. J. Lohmann, in accordance with the invention, data present on a processor bus is checked using signatures that are formed for it, which is equivalent to checking an internal state of the processor devices and hence to more a powerful verification. In the processor devices according to the invention, the signatures are interchanged when the processors are operating correctly.

In one preferred embodiment of the invention, the clock generation unit can be synchronized with a clock generation unit in a second processor device to support the establishment of microsynchronous operation. The second processor device is connected through the crossover bus, within a prescribed maximum synchronization tolerance and the processor unit can be started, based on the synchronized clock signal from the clock generation unit, by a start signal in synchronism with a processor unit in the second processor device within a prescribed maximum clock offset. Insofar as reference is made to a second processor device in this regard, such reference is not to be understood as being a restriction to just two devices in the processor system; instead, it means a specifically selected processor device, e.g., the one starting first or an already active processor device.

To carry out the signature verification, the bus control device beneficially contains a comparison module through whose inputs the signatures are supplied and which is set up for bitwise comparison of the signatures.

To compensate for transit times through the crossover bus, it is expedient if the personal signatures are supplied to the comparison stage through a silo memory with a time delay.

In a further preferred embodiment, the bus control device contains a cross reading device that is set up to reciprocally read out components of the processor device and/or of a second processor device, connected by the crossover bus, through the crossover bus and to enable the data that has been read at an instant that is synchronized with the cross reading device in the second processor device. The configuration permits components that are synchronized through the crossover bus to access nonsynchronized ("asynchronous") components.

In such a context, the cross reading device is beneficially set up so that, during read access to a component that can be accessed by the processor device, the cross reading device transmits the data received from the component through the crossover bus.

Equally, it is beneficial in such a context if the cross reading device is set up so that, instead of read access to a component which can be accessed by the second processor unit, the cross reading device receives the appropriate data from the second processor device through the crossover bus.

To manage access to "asynchronous" components, it is useful if the cross reading device controls access to the components of the processor device and of the second processor device based on the addressing of the address range associated with the relevant components,
 a first address range being associated with access by both processor devices to the relevant component of the processor device;
 a second address range being associated with access by both processor devices to the relevant component of the second processor device; and
 a third address range being associated with access by the processor devices to their own respective component.

In a further preferred embodiment, the bus control device contains a cross refresh master device that is set up to read out the content of the main memory by direct access operations and to transmit it together with the respective associated memory address through the crossover bus. The configuration permits coordinated copying of the relevant memory contents.

In such a context, it is expedient, in order to keep areas that are already copied per se up to date as well, if the master device is set up so that, during write access operations by the processor unit to the main memory within the address range of the memory contents already transmitted, it transmits a respective copy of the relevant memory data and memory addresses through the crossover bus.

Beneficially, the data interchanged through the crossover bus contains additional information relating to the data read or written during direct access, e.g., characteristic data indicating the beginning or end of a data block, or an address identifier for distinguishing between addresses and data.

It is also advantageous, particularly in order to compensate for different data transmission rates in the processor device and on the crossover bus, if the master device contains a silo memory as a buffer memory for the data and addresses that are to be transmitted through the crossover bus.

In order to prevent the silo memory from overflowing, the master device expediently contains a signal output that is activated at a prescribed filling level of the silo memory and that is connected to an input of the processor unit that slows down or temporarily halts write access operations by the processor unit to the main memory.

For coordinated copying of the memory contents, it is also useful if the bus control device has a cross refresh slave device that is set up to write memory contents received together with the respective associated memory address to the main memory at the appropriate address point through the crossover bus.

To compensate for different data transmission rates, it is advantageous if the cross refresh slave device contains a silo memory as buffer memory for the data and addresses transmitted through the crossover bus.

The objectives set above are likewise achieved by a processor system including at least two processor devices of the type illustrated, in which, according to the invention,
 the processor devices are connected to one another through the crossover bus,
 the processor units in the processor devices can be started, based on a common clock signal, so as to be synchronized with one another by a common start signal within a prescribed maximum clock offset; and
 the bus control devices in the processor devices are set up so that, with each subsequent data access operation by the processor units through the respective associated processor bus, they interchange signatures concerning the data access operation through the crossover bus, evaluate them in terms of their correspondence, and output an error signal if there is no correspondence.

The advantages of such a solution have already been illustrated in connection with the processor device according to the invention.

Beneficially, the processor system is set up to perform, based on an error signal, error handling, e.g., error diagnosis, at least in that processor device which triggered the error signal, and, during the error handling, to continue operation of the processor system on the at least one remaining processor device. The configuration achieves "frictionless" continuation of the operation of the processor system even in the event of an error occurring in one of the processor devices.

Other features that are considered as characteristic for the invention are set forth in the appended claims.

Although the invention is illustrated and described herein as embodied in a duplicable processor device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Before the description of the illustrative embodiment, it should be stated that the invention is not exhausted in the application to the control of a switching office in an asynchronous transfer mode ("ATM") system or in another communication system, but rather can be used for any other processor-controlled systems in which duplication—or, in more general terms, multiplication—of the processor device is appropriate on account of the demanded error immunity.

In all the figures of the drawing, sub-features and integral parts that correspond to one another bear the same reference symbol in each case.

Duplication of the Processor Device

Figure 1:
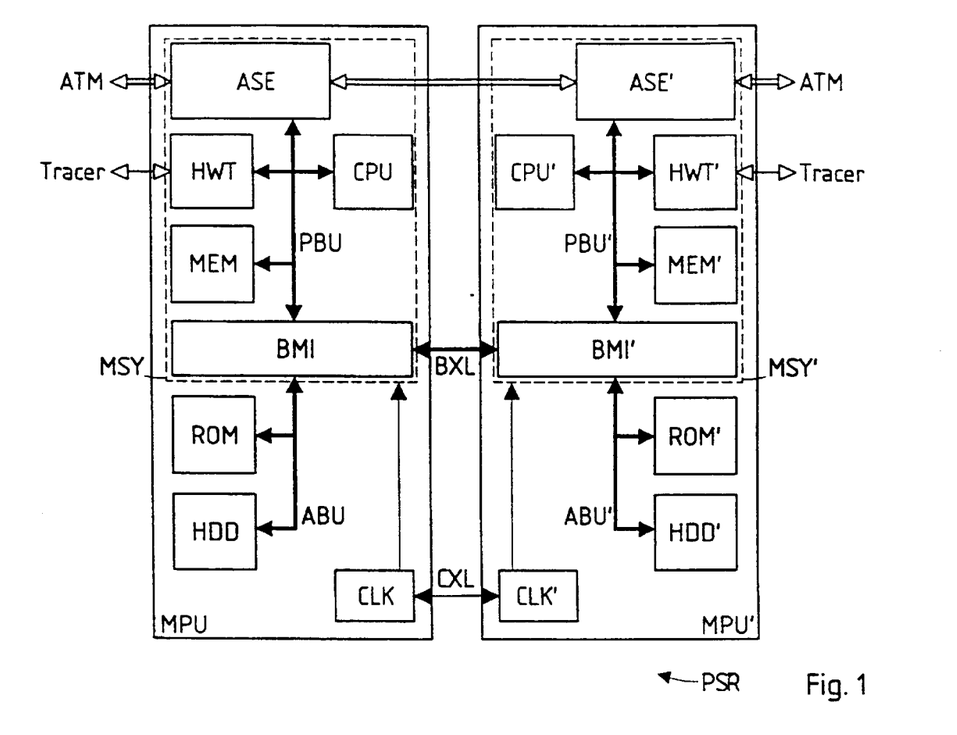
FIG. 1 is a block circuit diagram of the components of the processor system according to an illustrative embodiment of the invention.

Referring now to the figures of the drawings in detail and first, particularly to FIG. 1 thereof, there is shown the essential components of the processor controller PSR in an ATM switching office according to the invention. The switching controller PSR has two processor devices MPU, MPU' (Master Processing Units) having a fundamentally identical configuration and whose respective components may be combined to form one or more assemblies. In the illustrative embodiment, each processor device MPU, MPU' is a unit in a unit rack that overall represents the processor system for the ATM switching system, has two or more unit locations for the processor devices, and may under some circumstances also provide other components of the application, e.g., driver modules for the ATM network and power supply units. In principle, the very presence of a processor device in the processor system PSR is sufficient for performing the tasks of switching control, because each processor device MPU, MPU' is configured such that it is able to safeguard full operation without the presence of a partner device MPU', MPU. Duplication serves the purpose of being able to change over to the previously passive processor device as "inconspicuously" as possible in the event of failure of the active processor device. The switchover situation arises, for example, in the event of an error—which can never be completely ruled out even in inherently very reliable systems—or when the processor device is being serviced.

Each processor device MPU contains a processor unit CPU (Central Processing Unit) and a main memory MEM, which is in the form of a dynamic RAM, for example. Other possible components are, for example, a permanent memory ROM (Read Only Memory), which, by way of example, is in the form of an EPROM module and contains the programs and data necessary for initializing the processor device MPU, and also a hard disk memory HDD, which is not necessarily located on the push-in unit of the processor device MPU but is uniquely associated with the processor device. A clock generator CLK (Clock) supplies a system clock signal, in the example 100 MHz, which is used for clocking the processor CPU and for synchronization with the other components. In addition, there are usually application-specific components, in the example an ATM transceiver module ASE that takes care of the actual functions of the ATM switching and is controlled by the processor CPU. Finally, a tracer interface HWT (Hardware Tracer interface) is provided to which a tracer can be connected to track execution in (trace) the processor device. A processor bus PBU is used for interchanging digital data between the processor CPU and other components of the processor device. The bus functions of the processor bus PBU are controlled by one of the aforementioned components or by a dedicated device. The components of the second processor device MPU' are the same as those of the first processor device MPU and, thus, have the same reference symbols in FIG. 1, a prime (') having been added to them for the purposes of distinction.

To interchange signals between the duplicated processor devices MPU, MPU', each processor device contains a bus control device BMI (Bus Memory Interface). The bus control devices in the two processor devices are connected to one another through an interface set up specifically for the purpose of establishing and monitoring the microsynchronism and is called a crossover bus BXL (Bus Cross Link) below. In the illustrative embodiment, the bus control device BMI beneficially undertakes the functions for controlling both the crossover bus and the processor bus. The bus control device BMI may be produced as an individual unit or by using various components of the processor device PSR; if appropriate, the bus control device BMI components may also be provided for further tasks.

The crossover bus BXL is a parallel, two-way bus between the two processor devices MPU, MPU' or bus control devices BMI, BMI' of the switching controller PSR. It can be connected as a half-duplex 16-bit bus or as a full-duplex 8-bit bus, the setting of these bus modes being strictly coupled to the operating mode of the crossover bus BXL. A distinction is drawn between microsynchronous operation and non-microsynchronous operation for the operating mode, the non-microsynchronous operating mode being capable of being split up further into the refresh phase, i.e., establishment of the microsynchronous operation, and "solitary" operation, in which only one processor device MPU is operating, while the other MPU' is not present or operational, for example, because of an error or because of servicing. The bus control device BMI governs, in particular depending on the operating mode of the processor controller PSR, which components of the bus control device BMI are activated. For such a purpose, control signals are also interchanged between the bus control devices BMI, BMI' through the crossover bus in order to coordinate the operating modes for the processor devices MPU, MPU' concerned.

To buffer various information transmitted through the crossover bus BXL, silo memories are beneficially used. Silo memories are also referred to as FIFO memories (First In-First Out), queues, or queue memories; data stored in a silo memory can be retrieved only in the order in which it arrived, and is erased from the silo memory after retrieval.

In addition, the clock generators CLK, CLK' in the two processor devices can be synchronized; specifically, the two clock generators CLK, CLK' are permanently synchronized with one another for as long as they are in the error-free state in the switching controller PSR. Synchronization is performed through clock crossover lines CXL (Clock Cross Link) which, logically, belong to the crossover bus, but are configured to be separate in the illustrative embodiment. The system clocks are synchronized when a processor device MPU' is initialized, by virtue of the clock signal for the first processor device MPU—if present—being adopted by the clock generator CLK'. From that point on, the two clock generators remain permanently synchronized with one another, with the permitted synchronization tolerances, e.g., a maximum time difference in nanoseconds, being stipulated depending on the embodiment.

Microsynchronous Operating Mode

An essential aim of the invention is to be able, during correct operation, to operate the processor devices MPU, MPU' in full operation mode at the same time such that their system clocks are synchronized with one another and their processors CPU, CPU' perform the same operations on the same clock edge. The particular type of synchronism is referred to below as "microsynchronism." The invention is, thus, concerned with the establishment, maintenance, and monitoring of microsynchronous operation of duplicated systems PSR, including outwardly correct changeover in the event of an error.

Microsynchronous operation is monitored by constant interchange of verification signals in the form of signatures between the processor devices MPU, MPU'. A signature contains characteristic information for checking a data interchange, in other words, for such a case, data access by the processor CPU through the processor bus PBU. By way of example, the signatures may be formed in the manner of a checksum or using a combined data compression and selection method as characteristic code for the relevant variables in the data access, e.g., read/written data, memory address, port address etc., or a predetermined subset thereof. As such, in the event of a fault in microsynchronous operation, the contents of the interchanged signatures differ from one another and can, thus, be used for fault recognition.

This permits asynchronism occurring in the event of an error to be recognized after a latency time of four system clock cycles. An essential advantage of the invention is that the error recognition can intervene immediately after a hardware or software error and can effect changeover to the error-free processor device.

According to the invention, the processor bus access operations in the two processor devices MPU, MPU' are synchronized with one another in the microsynchronous operating mode. The components that can be accessed by the processors CPU, CPU' through the processor buses PBU, PBU' are, thus, likewise subject to the microsynchronism and form a respective "microsynchronous area" MSY, MSY' (framed by a dashed line in FIG. 1) in each processor device MPU, MPU'. The two "microsynchronous areas" are synchronized with one another by the common system clock signal from the clock generators CLK, CLK', and the same operations are performed at the same clock times in them. The two processor devices MPU, MPU' always take the same states so long as microsynchronous operation is running without error. To check the microsynchronism, signatures are interchanged through the crossover bus BXL. So long as the signatures of the processor devices are the same, microsynchronism is regarded as being preserved within the context of the inventive concept. With each bus access operation, the signatures are determined by the processor CPU and are transferred to the bus control device BMI. In one variant, the bus control device BMI itself could also calculate the signature for the processor bus.

A processor device MPU may also contain components that are not part of a "microsynchronous area" MSY. Such asynchronous components are, in particular, those for which access in synchronism with the system clock is not possible or is not worthwhile. With reference to FIG. 1, such is the case for a hard disk memory HDD or a permanent memory ROM, for example. Access to these asynchronous components is implemented using one or more asynchronous buses ABU, the bus control device BMI serving as the interface between the asynchronous bus(es), on one hand, and the "microsynchronous" processor bus PBU, on the other hand. Access to asynchronous components may, on one hand, be to the particular dedicated component, e.g., the processor CPU reads from the permanent memory ROM on the "active" side, and, similarly, the "passive" processor CPU' reads from the permanent memory ROM' on the "passive" side. On the other hand, asynchronous access to a particular component, e.g., a particular one of the two hard disks HDD, HDD', may take place, the data received in such manner being copied (cross read) to the other processor device. In such a way, it is possible for asynchronous components to be produced only singly or, even if they are duplicated, to be addressable as different devices.

Monitoring of Microsynchronism (Signature Interchange, Error Handling)

To check correct operation in the microsynchronous state, signatures relating to data on the processor buses PBU, PBU' are interchanged between the processor devices MPU, MPU' and are compared with one another. See FIG. 2. The processor CPU in the processor device MPU forms the signature psg for the processor bus PBU. The signature xsg of the partner device MPU' is supplied through the crossover bus BXL. In such context, to compensate for transit time delays, the personal own signature is buffered by a silo memory PFF. The two signatures are supplied to a comparator VGL, which compares the signatures bit by bit and whose output signal is activated in the event of at least one bit of the incoming signatures being disparate; the output signal is removed cyclically through a D-type flipflop and is transferred to the control logic of the bus control device BMI as a signature check signal sf1.

Figure 2:
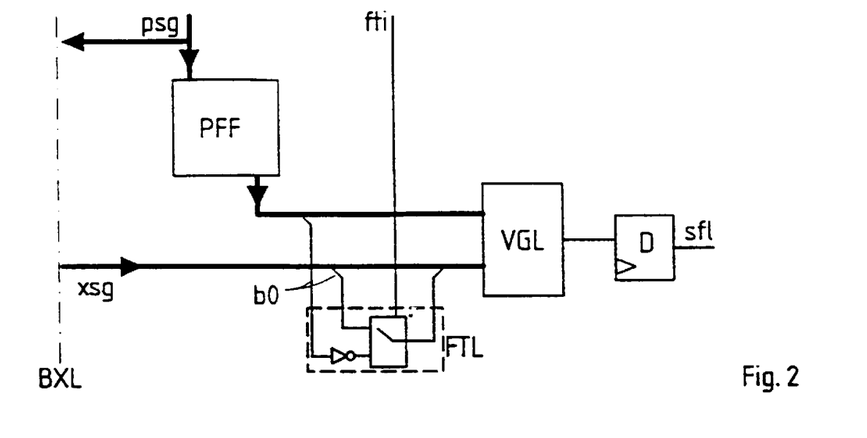
FIG. 2 is a block and schematic circuit diagram illustrating signature checking according to the invention.

For test purposes, a signature error can be simulated. A dedicated error test input fti is provided that activates a logic circuit FTL which replaces the first bit b0 of the partner signature with the inverted first bit of the personal signature. So long as no cross read access is taking place, signatures are interchanged. Beneficially, the crossover bus is switched to full-duplex mode in such a case, so that the signatures can be transmitted at the same time. If a cross read request arises, signature interchange is disabled and the data paths of the crossover bus are switched in preparation for cross reading. When changing over to the signature check after the end of the cross reading operation, the signal for activating the signature comparison remains deactivated for a further stipulated number of clock cycles, until there is synchronism between the personal signature and the interchanged signature again.

In addition, for test purposes, the signature check can also be turned off in microsynchronous mode using an input specially provided for such a purpose. This can be used to feign microsynchronous operation to an individual processor device MPU for test purposes.

Microsynchronous operation is started, beginning from a state in which the memory contents of the main memories MEM, MEM' in the two processor devices MPU, MPU' correspond, using, for example, a start signal provided for such purpose, the synchronization reset, which may also be implemented, if required, by a processor interrupt. Based on the synchronization reset, the two processor units CPU, CPU' are started in synchronism within a prescribed maximum clock offset, the so-called permissible clock skew, and consequently execute their commands microsynchronously.

The following states or events:

occurrence of a signature error—signature check signal sf1;

cross read timeout (see below);

occurrence of other error interruptions, e.g., on account of internal errors in the bus control device BMI;

system start or reset;

cause microsynchronous operation to end. In the case of an error, the error-free processor device continues to operate and, thus, undertakes operation in "solitary" mode; the other processor device carries out a self-test, as far as possible.

Appropriate displays or error messages can then be used to indicate the change of mode to the service personnel.

Access to the Asynchronous Area (Cross Reading)

The components of the bus control device that are concerned with carrying out cross reading are referred to as cross reading device (BXR, Bus Cross Read Control). The cross reading device can be produced as an individual unit of the bus control device BMI or can be produced by various components of the bus control device; the components of the cross reading device may also be provided for other tasks. The cross reading device is used for the reciprocal reading of components, in particular, asynchronous components, of the processor devices MPU, MPU' through the crossover bus BXL; the interchanged data is enabled at an instant that is synchronized with the partner cross reading device.

Access to a duplicated asynchronous component, e.g., the permanent memory ROM, ROM', is controlled by addressing the address area associated with the component. The possible access types are, as already mentioned, access to the particular dedicated component (ROM/ROM'), to the component (ROM) of the first processor device MPU or to the component (ROM') of the second processor device MPU'; in the second and third cases, a cross reading operation to the other processor device takes place. To implement the three different access operations, the address area corresponding to that for an individual component is advantageously quadrupled in the address area that can be accessed by the processor CPU.

Figure 3:
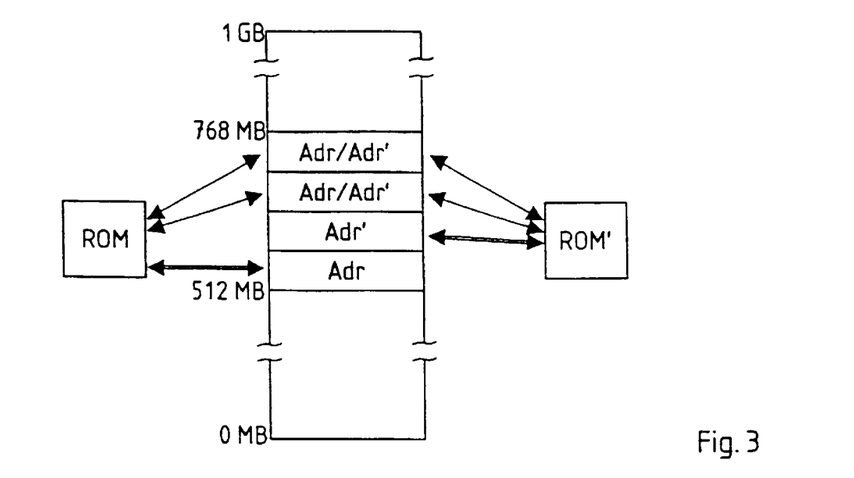
FIG. 3 is a block circuit diagram of a memory allocation of the address areas of a duplicated component according to the invention.

A diagrammatic example of the memory allocation is shown in FIG. 3 for the address areas Adr, Adr' in the permanent memories ROM, ROM' of the duplicated device PSR, each taking up an address space of 64 Mb; the entire address space allocated for the permanent memories, thus, includes 256 MB, e.g., from a base address 512 MB. When the first address area Adr is being accessed, the first memory ROM is accessed: the first bus control device BMI reads the data from the memory ROM through the appropriate asynchronous bus ABU, transmits the data to the other device BMI' through the crossover bus and synchronously enables the data on the two processor buses PBU, PBU'. Access to the second address area Adr' is equivalent to access to the second memory ROM', in which, instead of read access to the dedicated memory ROM, the first processor device takes on the data from the second processor device through the crossover bus BXL: in a similar fashion to the above case, the second bus control device BMI' reads the data from the memory ROM' through the appropriate asynchronous bus ABU', transmits the data to the first device BMI through the crossover bus, and synchronously enables the data on the two processor buses PBU, PBU'. During access to the third address area Adr/Adr', the respective dedicated permanent memory ROM, ROM' is accessed in the two processor devices MPU, MPU'; the crossover bus is not used. The fourth address area has no significance of its own and may, for example, be allocated the same function as the third area.

Thus, the cross reading mechanism permits the two processors CPU, CPU' to access the asynchronous data area MSY of an assembly in microsynchronous operation. Besides access through an asynchronous bus ABU, access to internal registers of the bus control device BMI is also handled in such a manner. Access to the asynchronous area or to internal registers of the bus control device is signaled through the crossover bus BXL using respective dedicated request signals that are each activated for the length of an entire bus cycle. An additional direction signal indicates the direction of data transfer between the bus control devices BMI, BMI'.

The data that has been cross read on the processor bus PBU, PBU' is enabled by a Ready signal. The Ready signal is used in all access operations to all components outside the synchronous area, and also for "dummy write" access operations, that is, write access operations to the asynchronous bus ABU, ABU' or registers of the bus control device in which no data is transmitted and can, therefore, be used for synchronizing the processors CPU, CPU'. The Ready signals are transmitted to the partner device through the crossover bus BXL if the corresponding request signal is valid and the cross reading function is activated; on the partner side, the Ready signal is expediently provided with a timeout. If the timeout expires without successful cross reading, an error signal and also an interrupt signal are triggered in order to prevent system blocking, and microsynchronous operation is ended. The duration of the timeout is given by the maximum duration of a cycle of the asynchronous bus plus internal delays. A typical value is, for example, 330 clock cycles.

Triggering of the error signal in the case of cross reading timeout is necessary because the receiving unit cannot terminate the cross reading operation while the drivers of the transmitting unit are still active; this is because the risk of damage would exist.

The cross read and "dummy write" requests can also be active in non-microsynchronous operation if the Ready signal is also not switched through over the crossover bus. However, the timeout is also started in non-microsynchronous operation—and is certain to expire because no Ready signal from the partner device is provided—and its associated interrupt informs the operating software of the prohibited access to the partner device in non-microsynchronous operation.

The cross reading operation can also be activated for access by other components of the microsynchronous area to asynchronous components, for example, in the case of a memory buffer set up in the main memory for a hard disk in the asynchronous area with data interchange between the main and hard disk memories, by direct access operations, for example.

Establishment of Microsynchronism (Cross Refresh)

According to the invention, microsynchronous operation can be established within a short time starting from a state in which only one processor device MPU is active (in the full operation state for operation of the processor system PSR as a switching controller), without disrupting operation. The second processor device MPU', which, for example, has just been inserted or reset and is now initializing its "passive" mode, is set to the present state of the active processor device MPU. The refreshing takes place "in the background," that is to say, without any delay to the operating cycles of the switching controller PSR. The aim of the update is parity of the memory contents and possibly peripheral states, such as, in this case, of the ATM modules, the two processor devices MPU, MPU'. For such a purpose, the bus control device BMI is set up, according to the invention, to directly access components of the processor device through the processor bus PBU, in particular, to access the processor bus PBU, in microsynchronous operation during an access pause in the processor CPU and to interchange data through the crossover bus BXL, the data being read and/or being intended to be written during the direct access, or relating to such data.

To carry out the refresh operation, the memory content of the "active" main memory MEM is copied into the "passive"

main memory MEM'. The "active" main memory MEM is read by direct access operations by the bus control device BMI through the processor bus PBU during an access pause in the active processor unit CPU (cross copy). The memory contents read out are transmitted to the passive processor device through the crossover bus BXL. In addition, during write access operations to the main memory MEM within the area of the memory contents already transmitted, the content of the corresponding address area of the "passive" memory MEM' is updated (cross update) by taking a respective copy of the relevant data and memory addresses from the processor bus PBU and transmitting the respective copy through the crossover bus BXL.

Figure 4A:
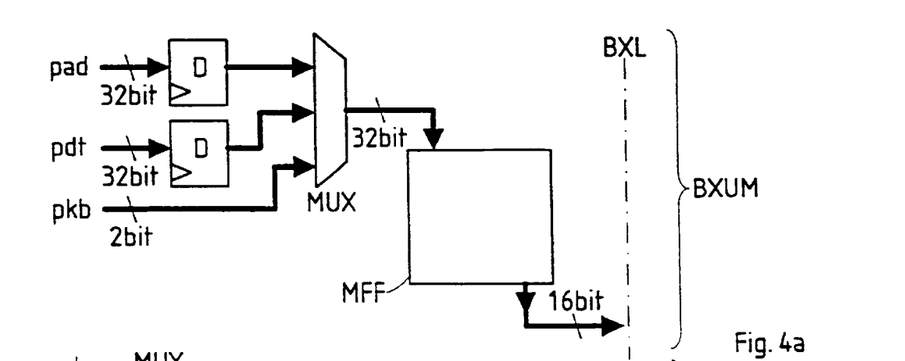
FIG. 4 is a block circuit diagram of data/addresses transmission during establishment of a microsynchronous state through a crossover bus illustrating the flow of data on the "active" side and on the "passive" side according to the invention.
Figure 4B:
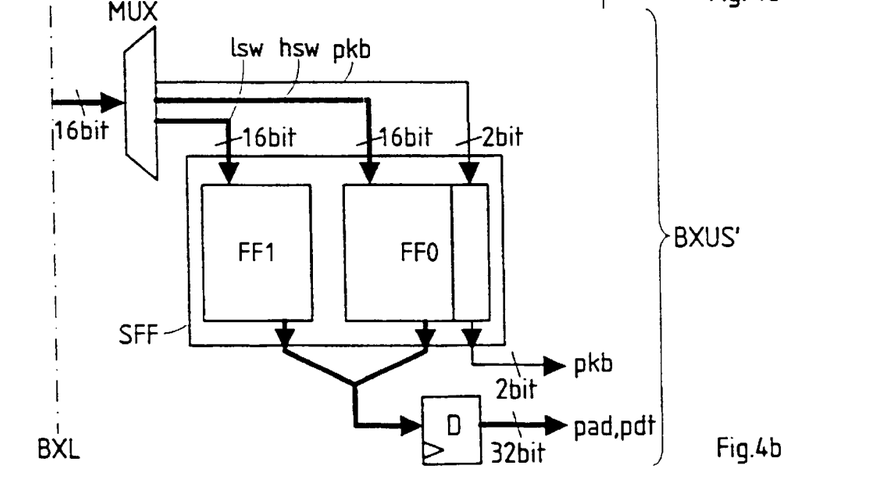

To carry out cross reading, the bus control device BMI (in each of the two processor devices, of course) has a cross refresh master device BXUM (Bus Cross Update Master) and a cross refresh slave device BXUS (Bus Cross Update Slave). The cross refresh devices BXUM, BXUS can be produced as dedicated units of the bus control device BMI, together in one cross refresh unit, or can be produced by various components of the bus control device; the components of the cross refresh devices may also be provided for other tasks. For the sake of brevity, the cross refresh devices are called master BXUM and slave BXUS below. During the refresh phase, the master BXUM in the active processor device MPU is the transmitter, which reads the content of the main memory MEM by direct access operations and transmits it, together with the respective associated memory address, through the crossover bus BXL, and the slave BXUS' in the passive processor device MPU' is the receiver, which writes memory contents received through the crossover bus BXL together with the respective associated memory address into the main memory MEM' at the appropriate address location. FIG. 4 shows the essential features of the flow of data during the cross refresh operation through the crossover bus BXL, omitting any elements that are not absolutely necessary for the purposes of understanding, in particular control lines and disable signals associated with the master devices and with the crossover bus.

On one processor device—apart from for test purposes— either the master BXUM or the slave BXUS is always activated, but not both at the same time. Similarly, in line with the nature of the refresh operation, only one of the masters in the processor devices MPU, MPU' is ever activated within the processor system PSR. Such activation is ensured in the processor devices by a cross refresh enable signal (BXUM enable) for activating the respective dedicated master BXUM, the BXUM enable signal being interchanged between the processor devices MPU, MPU' such that it disables the master in other processor devices. During the microsynchronous operating mode—apart from possibly for test purposes—the cross refresh devices BXUM, BXUS are deactivated; in particular, the slave BXUS is prevented from writing to the main memory in the full operation state.

Cross Refresh Master Device

The cross refresh master device BXUM has two interval registers that, in relation to the main memory MEM, define an address interval from which the memory content is to be read and is to be copied to the "passive"; side. Once the memory content of the address interval defined by the interval registers has been copied, the interval is advanced, preferably to an address interval adjoining the latter. At the same time, in connection with the base address of the main memory MEM, these registers define the area already copied that is to be updated during write access operations to the appropriate "passive" memory area MEM'.

During the refresh phase, the cross refresh master BXUM on the active side MPU checks that memory area of the main memory MEM that is defined by the interval registers for all write access operations and also for direct read access operations associated with the cross copy. If such access is recognized, the addresses and the data for the access operation and also additional information, e.g., a characteristic bit for distinguishing between addresses and data and/or a characteristic bit for identifying the end of the burst, are transmitted through the crossover bus BXL. Identification of the end of the burst is necessary in the case of the illustrative embodiment because a complete data record in the ATM application, a so-called burst, includes 20 word lengths. Depending on the embodiment, other additional information may be transmitted through the crossover bus.

In each processor bus cycle, the address is transferred to an address comparison register in the master BXUM with the address validity signal and is compared with the interval registers. The result of the comparison is evaluated together with the write signal for the main memory and with the direct access signal of the bus control device BMI, and the result of the evaluation is used to infer whether or not a cross refresh cycle needs to be carried out to transmit the data on the processor bus PBU through the crossover bus BXL. If not, the master BXUM waits for the next valid address. If, on the other hand, a cross refresh cycle is initiated, the data is written to a silo memory provided in the master BXUM.

In the illustrative embodiment, new data with the bus width, i.e., a 32-bit word, appears during a burst cycle with each clock cycle of the processor bus PBU. Hence, on the crossover bus BXL having a bus width of 16 bits, two clock cycles are needed. So as not to slow down the processor device MPU, a silo memory MFF (Master FiFo) is provided in the master BXUM to moderate the bottleneck on the crossover bus BXL. As shown in the block diagram in the upper half of FIG. 4, writing to the master silo memory MFF takes place with 32 bits in each case, while reading, i.e., transmission through the crossover bus BXL, respectively delivers 16 bits. Each address pad subject to cross refreshing and each data item pdt subject to cross refreshing are written. The address pad and the data word pdt are supplied to the silo memory MFF through D-type registers to control the clock state and through a multiplexer MUX.

As already mentioned, writing in the master silo memory MFF is 32 bit or 34 bit and reading is 16 bit or 18 bit. The addresses pad are transmitted with the associated characteristic bits pkb but without the two most significant bits in order to transmit the whole address in 32 bits. In the illustrative embodiment, transmission of the most significant bits can be dispensed with because the main memory MEM takes up only part of the address space. The depth of the master silo memory MFF is, for example, 20 times 34 bits, the 34 bits coming from the respective 16 bits of the address and of the data item plus the additional information, and the number 20 having been chosen in line with the burst length of the ATM application. The master silo memory MFF is connected to a slave silo memory SFF (Slave FiFo) in the other processor device MPU' and, so long as it is not empty, transmits the address and data words to the slave silo memory SFF.

In special cases, e.g., when a plurality of bursts that is subject to cross refreshing arise in succession in the active processor device MPU and the silo memory reaches its saturation level, the bursts need to be slowed down. The fact that the master silo memory MFF has reached saturation is indicated to the controller for the main memory MEM by a dedicated signal that slows down the write access operations to the memory, for example, by now permitting write access operations only at half the clock rate, or temporarily halts them until the signal is withdrawn again. The signal is activated when the silo memory MFF is almost full, that is to say, only two free entries remain, for example, and a bus access operation that is subject to cross refreshing is recognized.

The configuration prevents access operations that do not initiate a cross update anyway from being slowed down.

Cross Refresh Slave Device

The slave BXUS' adopts the data transmitted by the master BXUM through the crossover bus BXL. In the illustrative embodiment, 16-bit data and 2-bit control information (address/data characteristic bit and end-of-burst characteristic bit) are adopted in each cycle. As already mentioned, the slave BXUS' likewise has a silo memory, the slave silo memory SFF, in which, on one hand, data arriving through the crossover bus BXL is written and in which, on the other hand, the data is read and transferred to the processor bus PBU'. If at least one record including an address word and data word (that is to say, at least two entries in the silo memory) is present, the processor bus PBU' is requested and, as soon as the processor bus is free for the slave BXUS', a write cycle to the main memory MEM' is executed; during the process, a wait signal to the slave BXUM prevents the loss of data.

As can be seen from the lower half of the block diagram in FIG. 4, the slave silo memory SFF includes two blocks FF0, FF1 having a depth of, for example, 36 cells each, to which information is written alternately. The more significant 16-bit word hsw of a long word and the less significant 16-bit word lsw of a long word are, of course, received successively through the crossover bus BXL; a multiplexer MUX distributes the words hsw, lsw and also the characteristic bits pkb between the silo memory blocks FF0, FF1. As such, conversion of the 2×16 bits to 32 bits (34 bits) is carried out. The characteristic bits of the two words hsw, lsw are redundant with respect to one another and are, therefore, stored only once for each long word of the address pad or of the data item pdt. As a result, one block FF0 is 18 bits wide and the other block FF1 is 16 bits wide. The data hsw, lsw, pkb coming through the crossover bus BXL is removed cyclically and is placed onto a bus to which the inputs of the silo memory cells FF0, FF1 are connected. The control lines for the inputs of the blocks FF0, FF1 are controlled by a 6-bit write counter, the least significant bit of the write counter deciding to which silo memory block information is written. As such, the control bits pkb are also stored only for entries with even-numbered addresses because the processor bus access operations take place, in principle, in 32-bit format.

When the slave silo memory SFF is read, the address pad is first loaded into an address comparison register and is compared there with the interval registers. If the address is not in the set area or if it is not a valid address, then the slave BXUS' takes itself out of operation and indicates the error through a signal output, which, for example, triggers an interrupt for error handling. If the address is in order, the processor bus PBU' is requested. If the slave BXUS' receives the bus, a write cycle to the memory MEM' is executed. Data is placed onto the processor bus PBU' until the characteristic bit signaling which is also stored in the silo memory SFF indicates the end of the burst.

As already described, the slave BXUS' has a split slave silo memory SFF that is operated cyclically and to which information can be written and read at the same time. An entry in the silo memory SFF is 34 bits. Of these, 32 bits are data pdt and address pad, and the two remaining bits are characteristic bits pkb, as explained further above, which are used for controlling the sequence of the bus cycles. However, the data on the crossover bus BXL is always transmitted in 32-bit format, regardless of the characteristic bits that are also transmitted on the crossover bus in the address word. If a filling level is reached in the slave silo memory SFF, so that less than 20 long words can be stored, the aforementioned disable signal is used to disable transmission of further data through the crossover bus BXL by the master BXUM in the partner device MPU.

The addresses/data are read from the master silo memory MFF, if and so long as it is not empty. The master and slave silo memories MFF, SFF are coordinated, in the illustrative embodiment, by a silo disable signal that originates from the slave BXUS' in the passive processor device and serves to block reading of the master silo memory MFF. Blocking may be necessary, for example, if the slave silo memory SFF would otherwise not be prevented from overflowing. A suitable monitoring circuit ensures prevention in the following manner. If the silo memory SFF on the slave BXUS' is filled beyond a preset limit—for example, if only 16 long words are now free, which means that it is no longer possible to store an entire ATM burst—then the silo disable signal is set. The silo disable signal is supplied to the slave BXUM on the partner side (in the active processor device MPU). If the silo disable signal is set while the slave BXUM is activated, then an internal blocking signal in the slave controller is used to block the processor bus PBU and/or the processor CPU to prevent further data from being transmitted. In addition, a timeout of 128 clock cycles is started in the slave BXUM; when the timeout expires, the blocking signal is lifted again, the slave BXUM is stopped, and error handling is triggered, for example, by an NMI. The process is a security measure that prevents continuous blocking of a processor device MPU in the event of a hardware error in the partner device MPU'.

The mechanism of the silo disable signal is disabled in all system states, apart from when the cross refresh master BXUM is active, in order to prevent unwanted blocking of the crossover bus BXL, e.g., by a faulty slave BXUS'. The silo disable signal is subject to edge detection at the input to the XUM such that the internal blocking signal is activated only if a falling edge occurs—the disable signal is low-active—and the master BXUM is activated.

Start of Microsynchronous Operation

The cross refreshing finally reaches a state in which the memory contents of the main memories MEM, MEM' in the two processor devices MPU, MPU' correspond. If such is the case, the bus control device BMI triggers a signal, the synchronization reset, which activates the microsynchronous mode and causes the two processors CPU, CPU' to process the subsequent commands microsynchronously.

Testing of Cross Refreshing

To test the cross refresh functions during microsynchronous operation or else during solitary operation of a processor device MPU, a cross refresh test loop (BXUT, Bus cross Update Testloop) is provided that can be activated through a dedicated control line. Only in such a test case is it possible to activate the master BXUM and the slave BXUS in the same processor device at the same time. The test loop shorts together the master EXUM and the slave BXUS in a processor device, but deactivates the connection through the crossover bus BXL to the other processor device MPU'. The connection is necessary to prevent any shorts on the data lines. During internal forwarding of the data from the master BXUM to the slave BXUS, the addresses are provided with an offset stored in a dedicated register so that the slave BXUS does not write the data back to the same address location.

It is noted that implementation of the cross refreshing per se does not presuppose that the processor devices concerned can be operated in a microsynchronous operating mode; instead, the cross refresh mechanism is suitable for duplicated processor devices of a more general type in which reciprocal updating of the main memory, for example, is required.

We claim:

1. A processor device, comprising:
   a clock generation unit;
   a processor unit connected to said clock generation unit;
   a main memory;
   a processor bus configured as a data and address bus for said processor unit and said main memory;
   a crossover bus to be connected to at least one further processor device; and
   a bus control device having an interface for said crossover bus, said bus control device having an operating mode sharing microsynchronism with the at least one further processor device connected through said crossover bus during operation of the processor device, said bus control device configured, when data is interchanged through said processor bus:
   to process a personal signature for interchanged data;
   to interchange said personal signature with the at least one further bus control device of at least one further processor device through said crossover bus;
   to compare a received signature with said personal signature; and
   to output an error signal triggering error handling in the processor device when said personal signature and said received signature do not correspond.

2. The processor device according to claim 1, wherein said bus control device is configured to process, to interchange, to compare and to output upon data access by said processor unit.

3. The processor device according to claim 1, wherein said bus control device is configured to at least one of calculate and receive a personal signature for interchanged data.

4. The processor device according to claim 1, wherein said bus control device is configured, when data is interchanged through said processor bus, to output an error signal triggering error diagnosis in the processor device when said personal signature and said received signature do not correspond.

5. The processor device according to claim 1, wherein the at least one further processor device is a second processor device having a second clock generation unit and a second processor unit, the second processor device is to be connected through said crossover bus, said clock generation unit produces a synchronized clock signal and is to be synchronized with the second clock generation unit within a prescribed maximum synchronization tolerance, and said processor unit can be started, based on said synchronized clock signal, by a start signal in synchronism with the second processor unit within a prescribed maximum clock offset.

6. The processor device according to claim 1, wherein said bus control device has a comparison module configured to compare bits of said personal signature and said received signature.

7. The processor device according to claim 1, including a silo memory for supplying, with a time delay, said personal signature to be compared.

8. The processor device according to claim 1, wherein the at least one further processor device has a second cross reading device and is to be connected through said crossover bus, said bus control device has a cross reading device configured to reciprocally read out components of at least one of said processor device and the at least one further processor device through said crossover bus, and said cross reading device is configured to synchronize data read with the second cross reading device.

9. The processor device according to claim 8, wherein said cross reading device is configured, during read access to a component to be accessed by said processor device, to transmit data received from said component through said crossover bus.

10. The processor device according to claim 9, wherein said cross reading device is configured to receive appropriate data from the at least one further processor device through the crossover bus instead of read access to said component to be accessed by the at least one further processor unit.

11. The processor device according to claim 8, wherein said processor device and the at least one further processor device each have components associated with a first address range, a second address range, and a third address range, said cross reading device controls access to said components of said processor device and access to the components of the at least one further processor device based on addressing of said first, second, and third address ranges, said first address range associated with access by both the processor device and the at least one further processor device to a relevant component of the processor device, said second address range is associated with access by both the processor device and the at least one further processor device to a relevant component of the at least one further processor device, and said third address range is associated with access by the processor device to components of the processor device and the at least one further processor device (MPU, MPU') to components of the at least one further processor device.

12. The processor device according to claim 1, wherein said bus control device contains a cross refresh master device configured to read out content of said main memory by direct access operations and to transmit said content together with a respective associated memory address through said crossover bus.

13. The processor device according to claim 12, wherein said cross refresh master device is configured to transmit a respective copy of relevant memory data and memory addresses through said crossover bus during write access operations by said processor unit to said main memory within an address range of memory contents already transmitted.

14. The processor device according to claim 13, wherein data interchanged through said crossover bus includes additional information relating to at least one of data read and written during direct access and an address identifier for distinguishing between addresses and data.

15. The processor device according to claim 14, wherein said data read and written during direct access includes characteristic data indicating at least one of a beginning of a data block and an end of a data block.

16. The processor device according to claim 12, wherein said cross refresh master device has a silo memory as a buffer memory for data and addresses to be transmitted through said crossover bus.

17. The processor device according to claim 16, wherein said silo memory has a prescribed filling level, said cross refresh master device has a signal output connected to said processor unit and activated at said prescribed filling level for at least one of slowing down and temporarily halting write access operations by said processor unit to said main memory.

18. The processor device according to claim 13, wherein said bus control device has a cross refresh slave device configured to write memory contents received together with a respective associated memory address to said main memory at an appropriate address point through said crossover bus.

19. The processor device according to claim 18, wherein said cross refresh slave device has a silo memory as buffer memory for data and addresses transmitted through said crossover bus.

20. A processor system, comprising:
  a crossover bus;
  a common clock signal; and
  at least two processor devices connected to one another through said crossover bus, each of said at least two processor devices having:
    a clock generation unit;
    a processor unit connected to said clock generation unit;
    a main memory;
    a processor bus configured as a data and address bus for said processor unit and said main memory; and
    a bus control device having an interface for said crossover bus;
  each of said processor units started based on said common clock signal to synchronize each of said processor units with one another within a prescribed maximum clock offset;
  each of said bus control devices having an operating mode sharing microsynchronism with at least one other of said at least two processor devices connected through said crossover bus during operation of a respective one of said at least two processor devices, each of said bus control devices configured, with each subsequent data access operation by said processor units through a respective one of said processor buses, to interchange signatures concerning data access operation through said crossover bus, to evaluate said signatures in terms of correspondence, and to output an error signal if no correspondence exists.

21. The processor system according to claim 20, wherein each of said bus control devices is configured, when data is interchanged through said processor bus:
  to process a personal signature for interchanged data;
  to interchange said personal signature with a bus control device of at least one other of said at least two processor devices through said crossover bus;
  to compare a received signature with said personal signature; and
  to output an error signal triggering error handling in a respective one of said at least two processor devices when said personal signature and said received signature do not correspond.

22. The processor system according to claim 20, wherein at least in a processor device triggering an error signal, the processor system is configured to perform, based on said error signal, error handling, and to continue operation of the processor system on at least one remaining processor device of said at least two processor devices during error handling.

23. The processor system according to claim 22, wherein the processor system is configured to perform, based on said error signal, error diagnosis.

* * * * *